Figure 1:
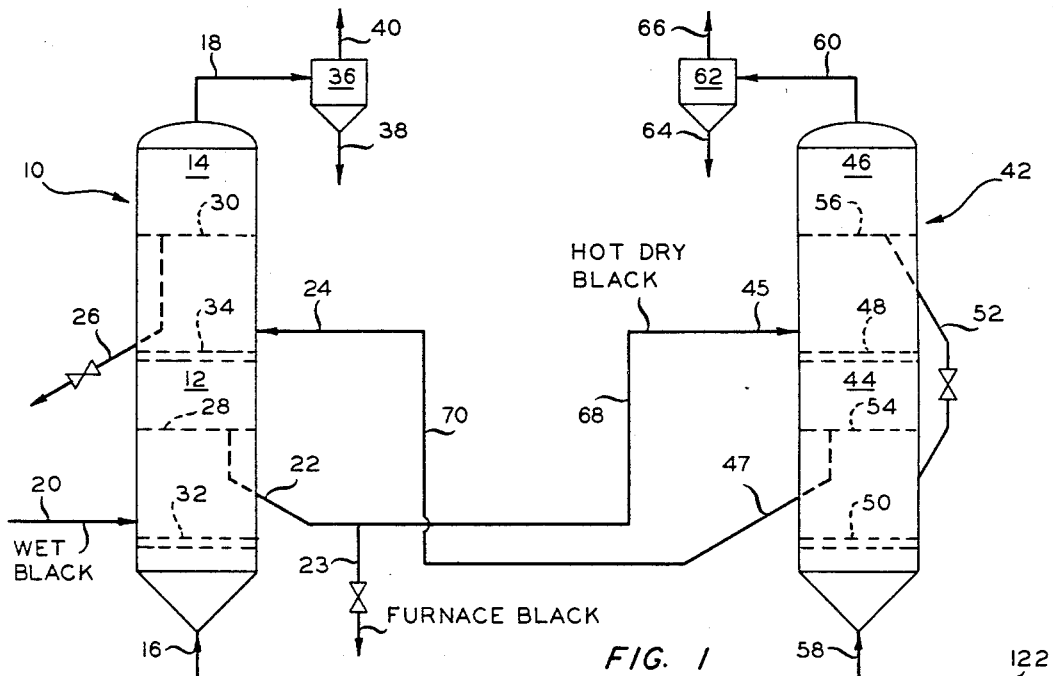

Nov. 19, 1968  R. E. DOLLINGER ET AL  3,411,928

FLUIDIZED BED DRYING AND OXIDIZING OF CARBON BLACK

Filed Aug. 22, 1963

INVENTORS
R. E. DOLLINGER
D. S. JOY
BY
Young & Quigg
ATTORNEYS

United States Patent Office 3,411,928
Patented Nov. 19, 1968

3,411,928
FLUIDIZED BED DRYING AND OXIDIZING
OF CARBON BLACK
Robert E. Dollinger and David S. Joy, Bartlesville, Okla., assignors to Phillips Petroleum Company, a corporation of Delaware
Filed Aug. 22, 1963, Ser. No. 303,799
4 Claims. (Cl. 106—307)

This invention relates to an improved process for drying and oxidizing furnace blacks.

In our copending application entitled Process and Apparatus for Oxidizing Carbon Black Pellets, Ser. No. 303,875, filed Aug. 22, 1963, a process and apparatus are disclosed for the fluid bed treatment of furnace black pellets to produce simulated channel black. This invention is an improvement in the process and apparatus disclosed therein.

It is an object of the invention to provide an improved process and apparatus for drying and oxidizing furnace black to produce simulated channel black. Another object is to conserve heat in the drying and oxidizing of furnace black. Other objects of the inveniton will become apparent to one skilled in the art upon consideration of the accompanying disclosure.

A broad aspect of the invention comprises drying wet pellets from a carbon black pelleting process with a hot gas inert to the carbon black, followed by oxidizing the dried pellets with an $O_2$-containing gas at an elevated temperature, and cooling the hot oxidized pellets with the off-gas from the fluidized bed dryer. In a preferred embodiment of the invention, the fluidized bed cooling is effected in a stacked bed over the drying bed, whereby the effluent dry gas passes thru a distributor separating the two beds and thence thru the cooling bed. Because of the moisture content of the off-gas from the dryer, the temperature of the hot pellets in the cooling bed must not be reduced below about 300° F. so as to avoid or prevent condensation of moisture on the oxidized pellets, the moisture content necessarily being maintained below about 1 weight percent and, preferably, below 0.5 weight percent.

In a further refinement, the oxidizing step is effected in stacked beds (two or more) to provide better control and more uniform oxidation of pellets as disclosed in said copending application. The effluent pellets from the fluidized drying bed are finished furnace black pellets ready for packaging or shipment to the user. A portion of the effluent stream of pellets from the dryer may be recovered as such product, while the remaining portion is passed to the oxidation step to prepare simulated channel black pellets for specific uses in which channel black pellets or carbon black pellets of corresponding characteristics have more utility than furnace black pellets. Such uses include compounding with rubber for off the highway use such as in farm implement tires, trucks, mining vehicles, etc.

In another embodiment of the invention, the cooler is entirely separate from the dryer and the dryer off-gas is piped to the cooler.

Figure 2:
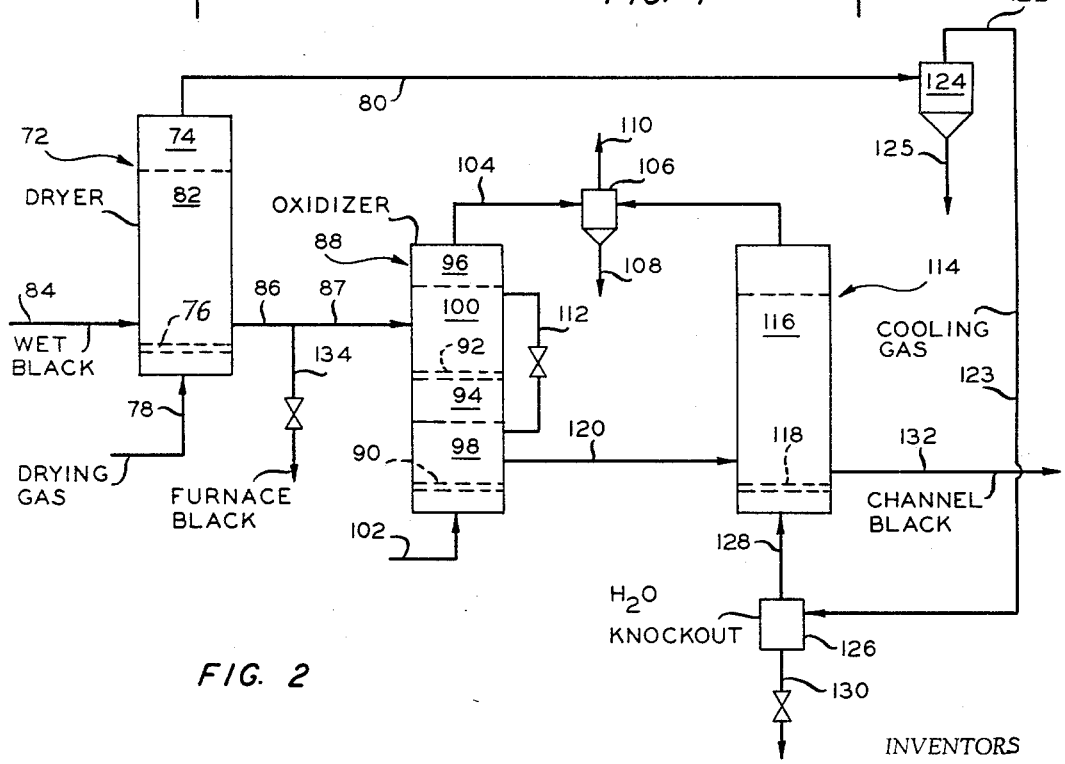

A more complete understanding of the invention may be obtained by reference to the accompanying schematic drawing of which FIGURE 1 is a view of one arrangement of apparatus for effecting the invention and FIGURE 2 is a view of another arrangement of apparatus suitable for effecting the invention.

Referring to FIGURE 1, a treating vessel 10 encloses a drying chamber or compartment 12 and cooling chamber or compartment 14. Vessel 10 is provided with an inlet gas line 16 and an effluent gas line 18 connecting with the bottom and top thereof, respectively. A wet pellet inlet conduit 20 leads into the lower chamber and an effluent pellet line 22 leads therefrom. Pellet take-off 23 connects with line 22 for withdrawal of furnace black pellets. A pellet feed line 24 and a pellet effluent line 26 connect with the upper cooling chamber 14. Numerals 28 and 30 designate the upper level of the fluidized beds in compartments 12 and 14, respectively. Gas distributor plates 32 and 34 define horizontal boundaries of the two compartments in vessel 10. These gas distributor plates are conventional in the art and are designed to distribute the gas flowing thru the beds substantially uniformly over the cross section thereof and prevent passage of pellets therethru. Line 18 leads into a suitable separator 36 for removal of fines from the off-gas, the fines being recovered thru line 38 and the relatively clean off-gas being vented thru line 40.

Oxidizing vessel 42 encloses stacked compartments 44 and 46 separated by gas distributor plate 48. A second gas distributor plate 50 defines the lower end of oxidizing chamber 44. Downcomer conduit 52 connects the upper and lower oxidizing chambers, providing gravity flow of pellets from the upper to the lower chamber. The upper level of the beds in the two chambers are designated by numerals 54 and 56. Gas inlet line 58 and gas effluent line 60 connect with the bottom and top, respectively, of vessel 42 to provide for passing oxidizing gas thru the stacked beds therein. The effluent gas line 60 leads into a suitable separator 62 which removes the fines, passing same to line 64 and venting the off-gas thru line 66. Conveyor line 68 connects pellet effluent line 22 with the feed inlet 45 of chamber 46. Effluent pellet conveyor 70 connects the pellet outlet 47 of chamber 44 with the pellet inlet line 24 of chamber 14 of vessel 10.

Referring to FIGURE 2, vessel 72 encloses a drying chamber 74 above gas distributor plate 76. Gas inlet line 78 and effluent gas line 80 provide for upward flow of fluidizing and drying gas thru pellet bed 82. Wet black feed line 84 leads into chamber 74 and dry pellet effluent line 86 leads therefrom. Line 80 leads into a gas-solids separator 124 for recovery of solids thru line 125 and effluent gas thru line 122.

Oxidizer vessel 88 is provided with gas distributor plates 90 and 92 which divide the vessel into compartments 94 and 96 in which fluidized beds 98 and 100 are maintained. Oxidizing gas inlet line 102 and effluent line 104 connect with the bottom and top, respectively, of the vessel 88 to provide for upward flow of oxidizing gas thru the two chambers therein. Effluent gas line 104 leads into suitable gas-solids separator 106 from which fines are recovered thru line 108 and effluent gas is vented thru line 10. Effluent pellet conduit 86 of vessel 72 leads thru suitable conveyor means 87 into upper chamber 96 of vessel 88 for feeding dry furnace black pellets into the oxidizer. Downcomer 112 conveys pellets from the upper chamber 96 to the lower chamber 94.

Cooling vessel 114 encloses a fluidized cooling bed 116 above gas distributor plate 118. Effluent pellet conduit 120 from vessel 88 leads into vessel 114 above plate 118, providing flow of hot pellets from the oxidizer to the cooler. Cooling gas feed line 123 connects with the effluent line 122 of separator 124. Line 123 leads into a knockout pot 126 from which the cooling gas is passed thru line 128 into the bottom of vessel 114 and condensed water is vented thru line 130. Cooled pellet effluent line 132 leads from cooler 114 thru suitable conveyor means to bagging or shipping facilities.

A pellet take-off line 134 connects with line 86 downstream of dryer 72 to provide for withdrawing any desired proportion of the dried furnace black as product pellets.

In operating with the apparatus of FIGURE 1, a hot drying gas containing not more than about one volume percent of oxygen is passed thru line 16 into the bottom of vessel 10 from which it flows upwardly thru the bed of wet pellets in compartment 12 and then thru distributor plate 34 thru the hot pellets being cooled in compartment 14 in the fluidized bed therein. The effluent drying and cooling gas is vented thru line 18, separator 36 and line 40 with the fines being recovered thru line 38. The wet black introduced thru line 20 is dried in the lower fluidized bed in vessel 10 and dried pellets are recovered thru conduit 22 for passage thru conveyor 68 to oxidizer 42.

The drying gas is preferably combustion gas prepared by burning substantially stoichiometric quantities of fuel gas and air and tempering with water or recycle gas to produce a gas at a temperature of at least 850° F. and preferably in the range of 1000 to 1400° F. The residence time of the pellets in the fluidized drying bed is controlled so as to heat the pellets to at least 300° F. and to leave less than one weight percent of water and preferably less than 0.5 weight percent of water in the pellets.

The pellets of carbon black leave the drying bed at a temperaure of about 340 to 350° F., although it may vary some from this range. These warm pellets are fed thru conveyor 68 into the upper chamber 46 of oxidizer 42 from which they flow thru downcomer 52 into the next lower oxidizing bed 44. Oxidizing gas containing 5 to 30, preferably, 10 to 20 and, more desirably about 15 volume percent of oxygen is fed into vessel 42 thru line 58 at a temperature in the range of 550 to 825, preferably 650 to 775, and most desirably in the range of 720 to 750° F. The hot oxidizing gas passes upwardly thru both the upper and lower beds in the oxidizer, raising the temperature of the carbon black pellets substantially to the temperature of the inlet gas. The temperature in the first stage oxidizer (in compartment 46) is preferably maintained in the range of 720 to 730° F. while that in the second stage bed (in chamber 44) is preferably maintained in the range of 730 to 750° F. The residence time of the pellets in the oxidizer is maintained in the range of 30 to 240 minutes and preferably in the range of 50 to 70 minutes. Lower times in this range are usable with high oxygen concentrations and higher temperatures while longer residence times are required for lower oxygen concentrations and lower temperatures in the specified ranges. When utilizing an oxygen concentration in the range of 14 to 16 volume percent, which is preferred, and a temperature in the range of 720 to 750° F., also preferred, the residence time in the two beds or in a single bed when such is utilized, is maintained in the range of 50 to 70 minutes, depending upon the extent of oxidation desired.

The hot oxidized pellets from oxidizer 42 are passed via conduit 47, conveyor 70, and feed inlet conduit 24 into the cooler 14. The temperature of the pellets being fed into the cooler is usually in the range of 730 to 750° F. These hot pellets are cooled by the off-gas from compartment 12 in which the drying gas in passing thru the wet pellet bed is reduced in temperature, principally thru vaporization of water from the wet pellets, to a temperature in the range of 300 to 400° F. and the pellets are cooled to a temperature in this range. It is essential not to cool the pellets substantially below 300° F. to avoid condensation of moisture from the cooling gas onto the pellets. This cooling gas has high humidity due to absorption of water from the pellets in the dryer. The cooled pellets recovered thru line 26 are suitable for contact with air without danger of oxidation. However, it is desirable to allow the pellets to cool further in a nonoxidizing ambient, such as nitrogen.

Operating conditions in the apparatus arrangement illustrated in FIGURE 2 are very similar to those outlined with respect to FIGURE 1. In this arrangement, cooler 114 is separated from dryer 72 and is more expensive to construct, requiring extra conduits and other additional structure. However, the pellet treatment is very similar to that provided by the apparatus arrangement of FIGURE 1.

Furnace black pellets dried and treated in accordance with the invention are found to have characteristics substantially those of commercial grade channel black. Furnace black pellets of low modulus (300% modulus of 1350–1600 p.s.i.) having a pH of 8.5, a surface area of about 80 square meters per gram and a volatile content of about 2 weight percent have been oxidized in accordance with the invention to produce simulated channel black having a pH in the range of 4.5 to 5.6, a surface area in the range of 105 to 152 square meters per gram and a volatile content in the range of 4.6 to 5.9. Surface areas up to 175 square meters per gram are attainable by further treatment. These characteristics of the oxidized black closely approximate the corresponding characteristics of channel black of commercial grade. Rubber tests have been made with the simulated channel blacks comparing the rubber compound therewith with rubber compounded with commercial grade channel black and the rubbers were found to be comparable and suitable for the same type of service.

Certain modifications of the invention will become apparent to those skilled in the art and the illustrative details disclosed are not to be construed as imposing unnecessary limitations on the invention.

We claim:

1. A process for producing a simulated channel black from wet-pelleted furnace black pellets which comprises the steps of:
    (1) maintaining a fluidized bed of said wet pellets with a stream of hot non-oxidizing drying gas at an inlet temperature in the range of 1000 to 1400° F. so as to dry said pellets to a moisture content below about 0.5 weight percent, said pellets being introduced to a low section of said bed and dry pellets being withdrawn from the top of said bed;
    (2) maintaining a fluidized bed of effluent pellets from step (1) with a stream of an oxidizing gas containing $O_2$ in the range of 14 to 16 volume percent at a temperature in the range of 720 to 750° F. and a contact time in the range of 55 to 65 minutes so as to substantially oxidize said furnace black, lower the pH, and increase the surface area thereof;
    (3) maintaining a fluidized bed of effluent pellets from step (2) with a stream of non-oxidizing cooling gas comprising essentially the effluent drying gas of step (1) so as to cool said pellets to a temperature sufficiently low to permit exposure to air without oxidation of said black but not substantially below 300° F. to avoid condensation of moisture on the oxidized pellets; and
    (4) recovering the cooled pellets.

2. A process for treating wet furnace black pellets to produce dry, oxidized simulated channel black pellets which comprises the steps of:
    (1) maintaining said wet pellets in a fluidized bed in a drying zone while passing a non-oxidizing fluidizing and drying gas upwardly therethru at an inlet temperature of at least 850° F. so as to dry said pellets to a moisture content of less than 1 weight percent;
    (2) maintaining the dried pellets from step (1) in a fluidized bed in an oxidizing zone while passing fluidizing and oxidizing gas upwardly therethru so as to substantally oxidize said pellets; and
    (3) maintaining the oxidized pellets from step (2) in a fluidized bed in a cooling zone while passing the effluent drying gas from step (1) upwardly therethru so as to cool said pellets to a temperature not substantially below 300° F. but which permits contact with air without oxidation of the pellets.

3. The process of claim 2 wherein a substantial portion of the effluent pellets from step (1) is withdrawn as product furnace black pellets and a substantial remaining portion is passed to step (2).

4. A process for drying wet carbon black pellets and treating the dried pellets which comprises the steps of:

(1) passing said wet pellets to a lower level of a fluidized bed drying zone;

(2) forming a hot drying gas having an $O_2$ concentration below about 1 percent by volume by burning substantially stoichiometric quantities of fuel and air and tempering the resulting combustion gas with a non-oxidizing fluid to a temperature in the range of about 1000 to 1400° F.;

(3) passing the drying gas of step (2) upwardly thru the zone of step (1) at fluidizing velocity so as to dry said pellets to a moisture content below about 0.5 percent by weight substantially without oxidation thereof;

(4) withdrawing dried pellets at a temperature of at least 300° F. from a top section of said bed;

(5) passing dried pellets from step (4) to a fluidized bed oxidizing zone;

(6) passing hot oxidizing gas at an $O_2$ concentration in the range of 5 to 20 percent by volume and at a temperature in the range of about 550 to 825° F. upwardly thru the zone of step (5) at fluidizing velocity, providing an oxidizing time in the range of about 30 to 240 minutes to substantially oxidize said pellets, the temperature in said range being higher with low $O_2$ concentrations and vice versa and the time in said range being higher with lower $O_2$ concentrations and lower temperatures and vice versa;

(7) cooling the pellets from step (6) in a cooling zone in contact with a non-oxidizing gas to a temperature not substantially below 300° F. to prevent moisture condensation thereon but sufficiently low to permit exposure to air without causing further oxidation of said black; and (8) recovering pellets from step (7) as product pellets.

References Cited

UNITED STATES PATENTS

| | | | |
|---|---|---|---|
| 2,641,535 | 6/1953 | Cines | 23—209.9 |
| 2,682,448 | 6/1954 | Cines | 23—209.1 |
| 2,707,674 | 5/1955 | Sweitzer | 106—307 |
| 2,850,403 | 9/1958 | Day | 106—307 |
| 2,900,737 | 8/1959 | Heller | 106—307 |
| 2,908,586 | 10/1959 | Braendle et al. | 106—307 |
| 3,178,304 | 4/1965 | Eckert et al. | 106—307 |
| 3,216,843 | 11/1965 | Heller et al. | 106—307 |
| 2,890,942 | 6/1959 | Webster et al. | 23—314 |
| 2,952,921 | 9/1960 | Wood et al. | 23—314 |
| 3,050,378 | 8/1962 | Kron | 23—314 |
| 2,586,818 | 2/1952 | Harms | 259—4 |
| 2,677,608 | 5/1954 | McKay et al. | 75—9 |
| 2,867,540 | 1/1959 | Harris | 106—30 |

OTHER REFERENCES

Duffey: "Channel and Furnace Carbon Blacks," Official Digest, June 1949, pp. 347—352.

TOBIAS E. LEVOW, *Primary Examiner.*

S. E. MOTT, *Assistant Examiner.*